April 26, 1955  H. L. COX  2,706,907
MULTIPLE UNIT FATIGUE TESTING MACHINE
Filed Oct. 13, 1952  4 Sheets-Sheet 1

INVENTOR
Harold Leslie Cox
BY [signature]
ATTORNEY

April 26, 1955  H. L. COX  2,706,907
MULTIPLE UNIT FATIGUE TESTING MACHINE
Filed Oct. 13, 1952  4 Sheets-Sheet 4

INVENTOR
Harold Leslie Cox
BY
ATTORNEY

United States Patent Office 2,706,907
Patented Apr. 26, 1955

2,706,907

MULTIPLE UNIT FATIGUE TESTING MACHINE

Harold Leslie Cox, Teddington, England, assignor to National Research Development Corporation, London, England, a corporation of Great Britain and Northern Ireland Application October 13, 1952, Serial No. 314,510

19 Claims. (Cl. 73—91)

This invention relates to fatigue testing machines and its object is to provide a machine in which a number of specimens can be subjected to cyclically varying loads at high speed.

According to the invention the loading heads are disposed in a circle about the principal axis of the machine and each has a loading spring system which is cyclically deflected by a swash-plate which is universally pivoted on the principal axis but does not rotate, the swash-plate being rocked by a runner rotating about the principal axis and in engagement with the swash plate.

Each spring system, which conveniently comprises a simple helical spring, may abut between the swash-plate and a rod parallel to the principal axis and carried so that it can move only substantially longitudinally of itself while remaining parallel to the principal axis, the specimen being loaded through the rod.

The amplitude of motion of the swash-plate is preferably variable and this is conveniently effected by making its point of suspension movable along the principal axis while the rotating member always works at the same axial position.

The rotating member may have rolling engagement with the swash-plate. Since the parts of the machine from the swash-plate on cannot be free from friction and there are also slight mechanical hysteresis losses in these parts and in the specimens, energy must be imparted by the rolling member to the swash-plate, and if there were only a single roller, this could only occur if the tangent to the roller at the point of contact were not in a plane normal to the principal axis but sloped so that the roller would in effect always be running against a gradient, or in other words the point of greatest deflection of the swash-plate would lie behind the roller. The value of the gradient and therefore the value of the greatest deflection and therefore of the greatest spring loading would vary with any changes of friction and the like and in any case the system would easily tend to oscillate about the roller. To avoid this, two spaced rollers may be provided on the rotating runner in which case if the rollers are sufficiently spaced the point of greatest deflection lies between them and variations in friction and so forth do not lead to variations in deflection but merely to variations in the distribution of load between the two rollers; in practice the minimum separation dictated by a convenient roller diameter is more than enough to give this desirable result.

Alternatively to rolling contact, the rotating member may have a driving engagement with one race ring of an antifriction bearing, the other race-ring of which is carried by the swash-plate.

Advantageously stops are provided to limit the movement of the loading heads when the respective specimens break, and by making these in the form of electric contacts, corresponding counters actuated by the rotation of the machine can be stopped. In this way the number of cycles needed to break each specimen is recorded, and by watching the counters it will be known when all the specimens have broken, or a further circuit (for example established through a second contact at each head, all of these second contacts being in series if breaking of the specimen closes them, or in parallel if breaking opens them) could give a signal to indicate this, or could stop the machine.

The whole system is desirably dynamically balanced to minimise reaction on the mounting of the machine; this balance reduces the losses of energy to earth and hence reduces the load on the runner. The balance may be effected by an axially disposed, elastic cantilever carrying a symmetrically arranged mass at its end, and to save overall length the cantilever may be in part doubled on itself.

It is to be understood that the test pieces themselves need not all be similar nor need the same range of load be applied to each. The deflection of each spring is the same but the loading can be varied between the specimens by using springs of different stiffness. Preferably, however, opposite pairs of springs have the same stiffness.

Two convenient constructions embodying the present invention and arranged for applying tensile loads, are illustrated by way of example in the accompanying drawings in which.

Many parts of both constructions are identical. Such parts have therefore been given the same reference numerals.

Figure 1:
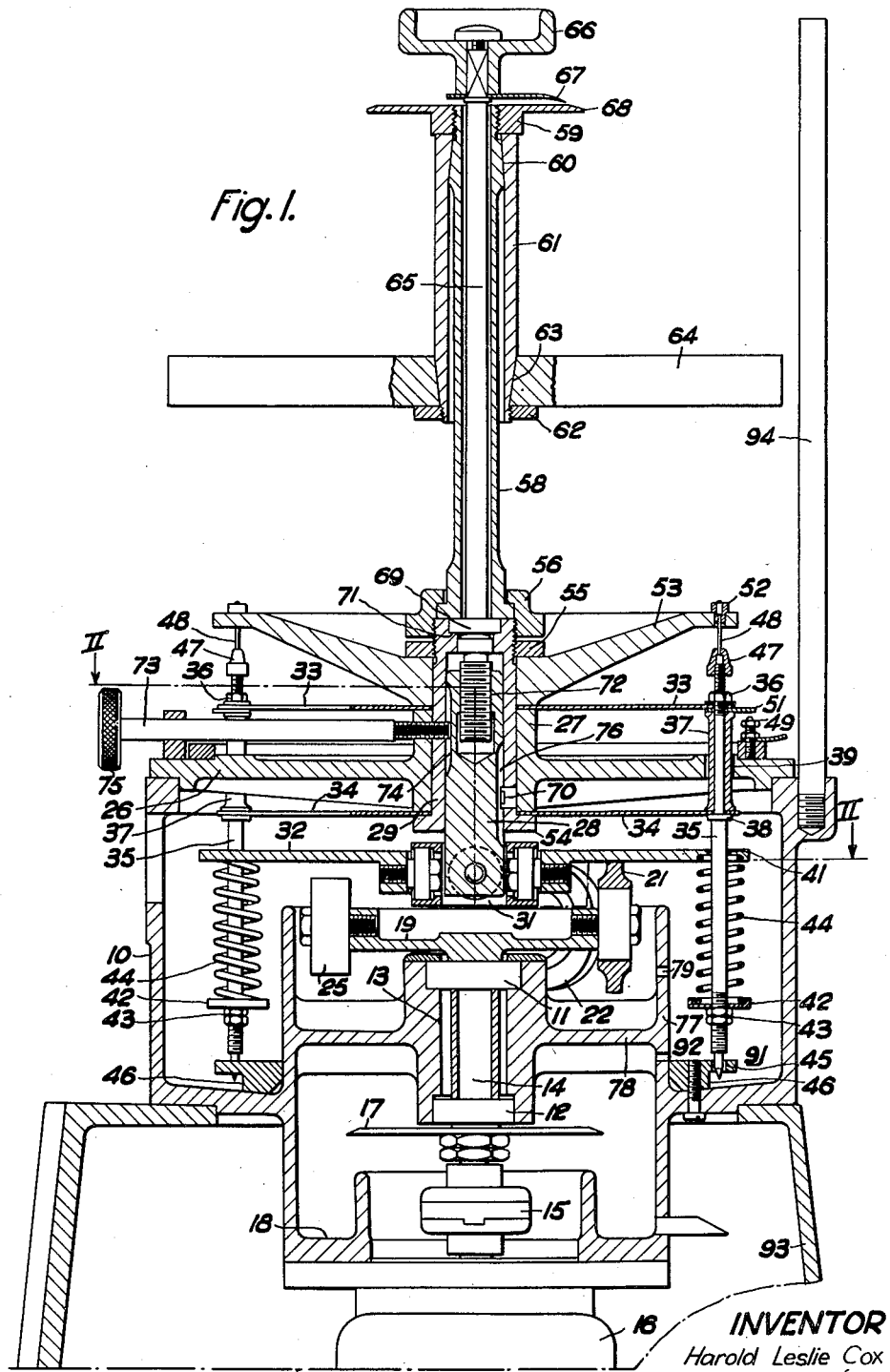
Fig. 1 is a section on the line I—I of Fig. 2, of the first construction of the complete machine.
Figure 2:
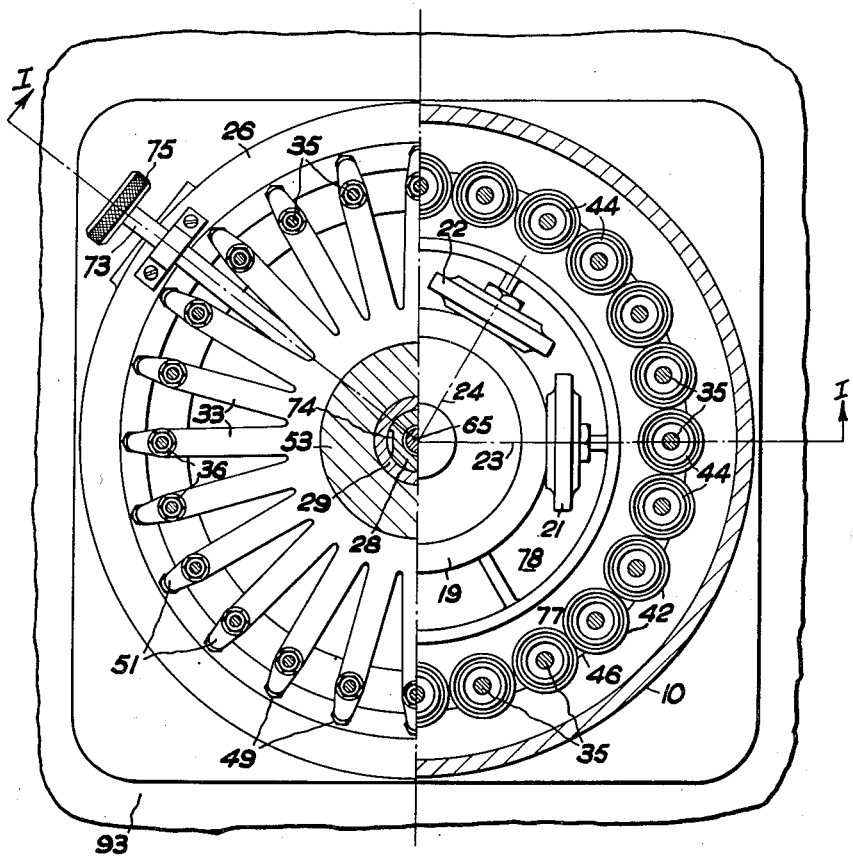
Fig. 2 is a detail plan view taken on the line II—II of Fig. 1.

Referring now to Figs. 1 and 2 of the drawings a base-chamber 10 carries spaced bearings, e. g. ball bearings 11, 12, in a central lower sleeve 13 for a vertical shaft 14 direct-driven, conveniently through an Oldham or double slider coupling 15, from a constant-speed electric motor 16, flange-mounted on the underside of the chamber. A thrower-plate 17 on the shaft directs any lubricant from above into an annular gutter 18 surrounding the coupling. Fast on the upper end of the shaft 14 is a roller or disc 19 which at its rim carries two rollers 21, 22. These rollers are freely journalled, as by double row ball bearings, on axes 23, 24, radial to the shaft and at, say, 60° apart. Opposite the rollers the disc has a balance-weight 25 fixed to it.

The upper end of the base-chamber 10 is closed by a coverplate 26 incorporating a central upper sleeve 27 coaxial with the shaft 14. A stem 28 is slidable but not rotatable in a bushing 29 in the sleeve 27, and to the lower projecting end of the stem 28 is universally jointed (as by gimbal-mounting 31) a swash-plate 32 which coacts with the rollers 21, 22. To the top and bottom of the sleeve 27 are secured two spiders 33, 34 of thin spring material such as aluminum alloy or steel, the lower spider 34 coming between the cover-plate 26 and the swash-plate 32. The outer ends of corresponding arms of the spiders are secured to loading rods 35 (as by nuts 36, distance sleeves 37 and flanges 38 on the rods) thus leaving the rods free to move substantially longitudinally while remaining parallel to the central axis of the machine but not otherwise. The rods pass through clearing holes 39 in the coverplate 26 and also continue downwards through clearing hole 41 in the swash-plate 32. Near their lower ends they carry collars 42 (retained for instance by nuts 43) for helical loading springs 44, the upper ends of which seat in corresponding recesses in the swash-plate 32. The extreme lower ends of the rods may enter clearing holes 45 in guide member 46 secured in the base-chamber 10. At their upper ends, the rods 35 carry the chucks 47 for the lower ends of the specimens 48. Stops 49 for the rods may be in the form of adjustable contact screws insulated from the coverplate and located just outside the rods 35 which are provided with projecting tongues 51 (held for example between the upper spider 35 and the distance sleeves 37 on the rods 35) to coact with the stops. Chucks 52 for the upper ends of the specimens are carried by a chuck-plate 53, which is conveniently held by fitting its centre over the upper end of the bushing 29. The lower end of the bushing has a flange 54 engaging the lower end of the upper sleeve 27 and its upper end is threaded to receive a nut 55 which keeps the chuck-plate 53 in position. The two spiders 33, 34 may be clamped respectively between the chuck-plate 53 and sleeve 27, and the flange 54 and sleeve 27. Another nut 56 by an inward flange clamps to the end of the bushing 29 a long upwardly extending hollow cantilever 58 and to the upper end of the latter is clamped (as by a nut 59 and a taper seating 60) a second hollow cantilever 61 extending downwardly outside the first cantilever 58 and carrying at its lower end (as by a nut 62 and a taper seating 63) a substantial weight in the form of a disc 64. The stiffness of the cantilevers and the mass of the weight are calculated to constitute a vibrating system which balances the rocking of the swash-plate at the running frequency.

Through the first cantilever 58 extends a rod 65 which has a hand knob 66 or the like at the top, and if desired a pointer 67 working over a dial 68 at the top of the cantilever to enable it to be rotated, and when so rotated its lower end moves the stem 28 to adjust the level of the centre of rocking of the swash-plate 32 in relation to the rollers 21, 22. To this end the lower end of the rod 65 could be of enlarged diameter and be threaded to screw into the bushing 29, a steel ball or the like thrust member being interposed between the end of the rod 65 and the upper end of the stem 28, the adjustment being against the loading springs. Preferably however, as shown, the rod 65 near its lower end is provided with a collar 69 which engages between a shoulder 71 in the bushing 29 near its upper end and the under-face of the inner cantilever 58, thus preventing the rod from moving longitudinally, and the lower end of the rod is threaded to engage in a tapped hole 72 in the end of the stem 28; in this case the stem can be moved positively in either direction. Preferably a clamp is provided, for instance a radial screw 73 passing through the upper sleeve 27 and bushing 29 and engaging a flat 74, on the stem 28. Conveniently the shank of the screw 73 is made long enough to bring its head 75 beyond the outside of the base-chamber 10. Rotation of the stem 28 may be prevented by a key 70 in the bushing and a keyway 76 in the stem, or the key and keyway might be oppositely arranged. It will be noted that either form of adjustment can be operated while the machine is running. It will also be apparent that when the rod 65 is rotated, the stem 28 and therefore the centre on which the swash-plate 32 rocks is moved vertically in relation to the rollers 21, 22 so that the amplitude of oscillation is correspondingly adjusted. To increase the amplitude, the stem 28 must be moved downwards. If no other change is made, this not only increases the amplitude of oscillation and therefore the range of load on the specimens, but also (since the mean position of the swash-plate is lowered) increases the mean load. However the mean load can be independently adjusted by the aid of the nuts 43, or, if need be, also by changing the springs 44.

Advantageously the rollers 21, 22 are of hardened steel and a track for them, not shown in the drawings, may be secured to the swash-plate. An oil bath may be provided for the rollers by an intermediate upstanding wall 77 and a horizontal wall 78 which carries the lower sleeve 13. This may overflow through a hole 79 into a lower annular channel 91, and thence back through another hole 92 in the intermediate wall 77 into the annular gutter 18. The bottom of the annular channel 91 conveniently serves for mounting the whole on a stool-like base 93, within which the gutter 18 and motor 16 are accommodated. The parts above the cover-plate 26 may be enclosed by a cover not shown located by the aid of vertical rods 94 projecting from the rim of the base chamber 10.

The number of loading rods will depend on the size of the specimens. Thus if small screws (e. g. 10 BA thread) are to be tested, there may be as many as say twenty-four, and the speed may be as high as 3,000 R. P. M. but for larger specimens a smaller number and a lower speed may be advisable. It will be understood that every head of the machine need not be used and if less than the full number is used, the specimens need not be evenly distributed, as the unused loading heads still react directly on the frame of the machine through the stops 49.

Figure 4:
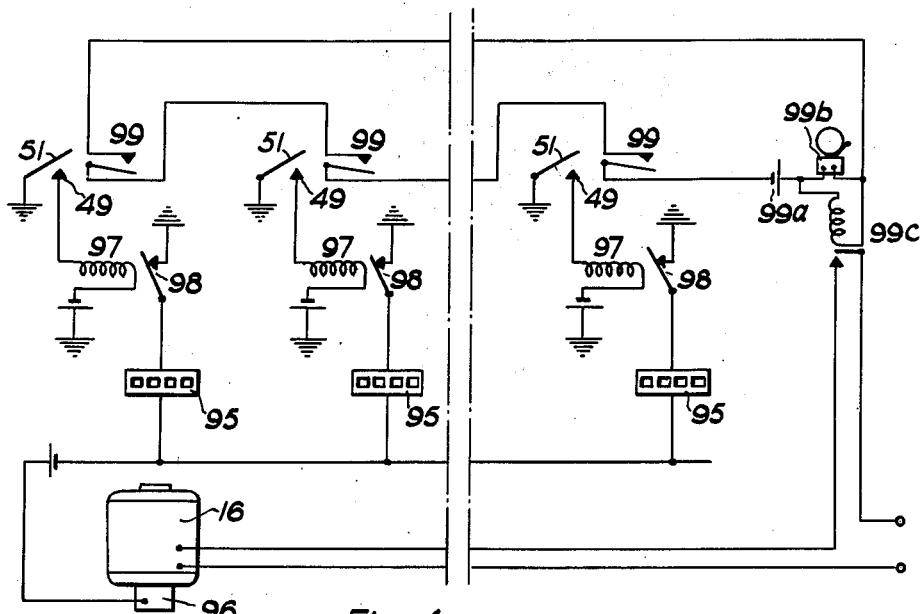
Figure 4 is a circuit diagram showing counting arrangements which may be used and Figure 5 is a detail showing how extra contacts employed in Figure 4 can be mounted on the machine.
Figure 5:
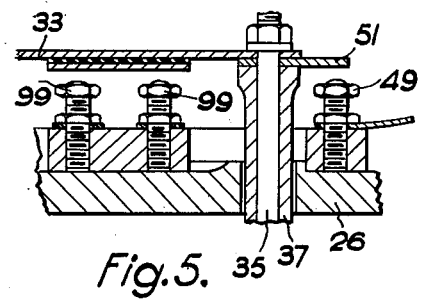

The machine is further provided with a counter for each loading head. Three such counters are shown at 95 in Figure 4. They are conveniently electrically operated counters such as are used for instance as message registers in telephone working, the circuit of each being closed in timed relationship to the rotation of the motor shaft by a switch of suitable construction indicated at the lower end of the motor shaft at 96. In the machine illustrated, when each specimen breaks and the tongue 51 touches the stop 49 the latter is connected to the frame of the machine so that all these contacts are in parallel. Accordingly each is arranged to close the circuit of a relay 97 which when excited opens a contact 98 in the circuit of the corresponding counter 95. Figure 4 also shows another signal given when all the specimens have broken. To this end a pair of contacts 99 is closed when the corresponding specimen breaks, and all these contacts are connected in series together with a battery 99a and a signal here represented as a bell 99b. As well as a bell there is also an electromagnetic trip 99c for the motor. Figure 5 shows how these contacts 99 may be mounted on the machine so as to be closed when the specimen breaks and the corresponding arm of the spider 33 moves downwards. The contacts are shown as adjustable screws similar to the stop 49, so that they may be adjusted to close simultaneously with the contacting of the tongue 51 with the screw 49.

Figure 3:
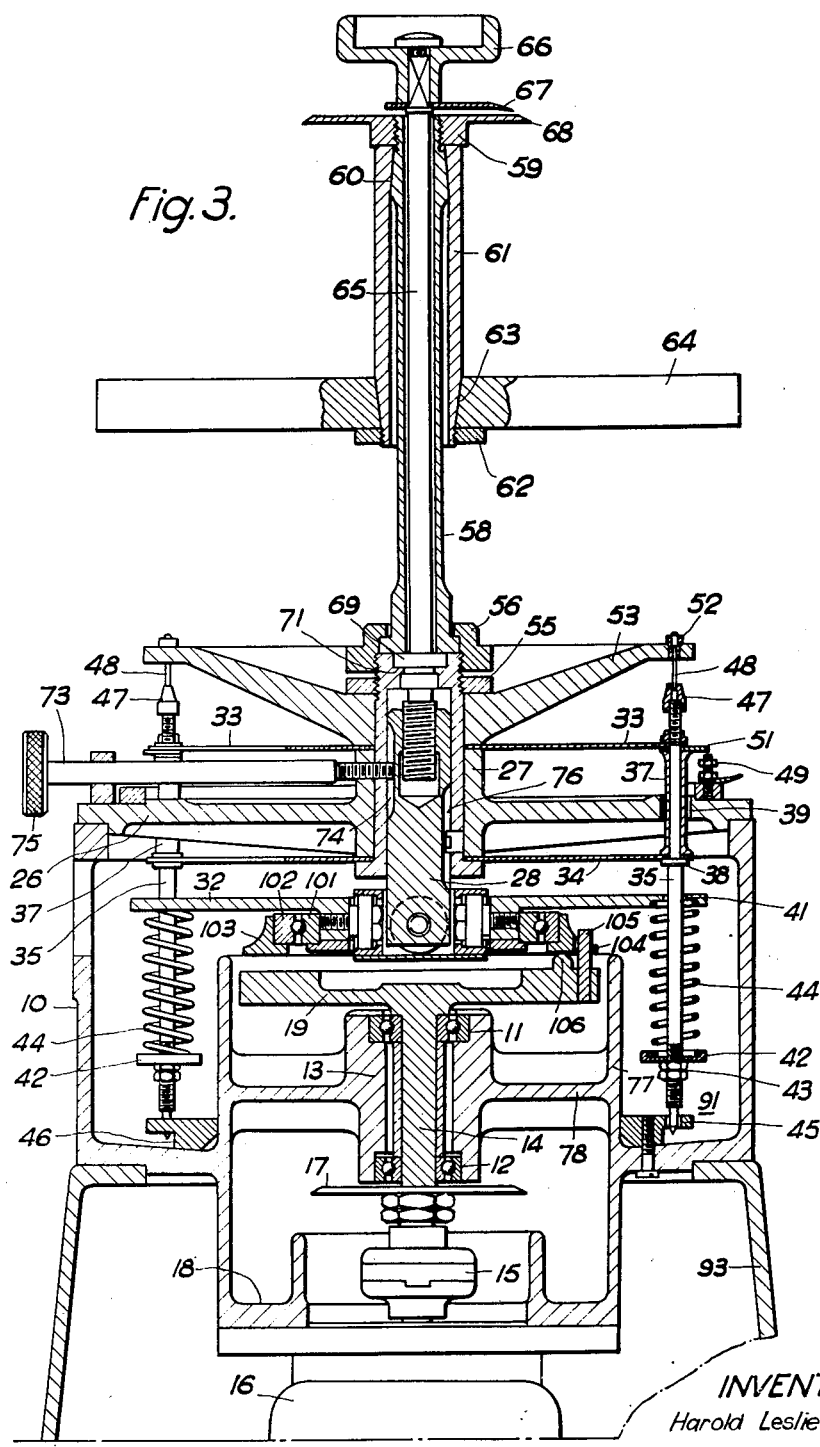
Fig. 3 is a similar view to Fig. 1 of the second construction.

Referring now to Fig. 3, those parts which are identical with the corresponding parts in Figs. 1 and 2 need not be described again. The sole difference lies in the means whereby the disc or roller 19 engages the swash-plate 32. In this construction the inner race ring 101 of a ball-bearing serving as a thrust bearing is carried by the swash-plate and the outer race-ring 102 is carried in an angle-section ring 103 which by jaws, of which one is seen at 104, engages a driving peg 105 carried by the disc 19. This engagement conveys the drive to the ring while permitting adjustment of the tilt of the swash-plate. The tilt is determined by contact of the underside of the ring 103 with a rounded projection 106 on the disc 19. No provision need be made to hold the ring 103 against the projection because the reaction of the load will maintain this contact. In this construction relative rotation is confined to the ball bearing which is well adapted to deal with this without difficulties due to friction or wear.

The lubricating arrangements may be generally similar to those of Fig. 1, though no actual oil bath within the wall 77 is necessary. In both constructions an oil pump may be used to provide a continuous oil supply, and in the case of Fig. 3 this would provide a supply to the ball bearing 101, 102.

Suitable changes necessary to load specimens in compression, bending, torsion, or some combination of these modes will readily occur to those skilled in the art. At the least nothing more than a different arrangement of the loading heads themselves will be necessary, but if the machine is primarily intended for some other mode of loading than tension, a different arrangement might be more convenient.

For example for compression loading, with the swash-plate and springs arranged as shown the loading heads and specimens might be arranged at the lower ends of the rods 35; if they are located at the upper ends a bifurcated or some similar arrangement at the upper ends of the rods would be desirable to carry the load symmetrically past the specimens.

What I claim is:

1. A fatigue-testing machine for subjecting a plurality of specimens to cyclically varying loads, comprising a main framework, a plurality of specimen-loading heads disposed in a circle around a principal axis each head including a part for anchoring a specimen to the main framework and a part for applying a load to the specimen, a loading spring system connected to the load-applying part of each loading head, swash-plate means universally pivoted to the main framework coacting with but not rotating in relation to said spring systems, and deflection means including a roller, said deflection means being journalled in the framework for rotation about the principal axis permitting engagement with the swash-plate means in a plane located to deflect the swash-plate means against the reaction of the spring systems in turn, thereby causing the swash-plate means to rock on its pivot and deflect the spring systems in a cyclically varying manner.

2. A fatigue-testing machine as set forth in claim 1, wherein each loading head and spring system comprises a rod parallel to the principal axis, means guiding the rod so that it can only move substantially longitudinally of itself while remaining parallel to said axis, spring means abutting between the swash-plate means and the rod, and means for applying the load from the rod to the respective specimen.

3. A fatigue-testing machine as set forth in claim 2, in which each rod carries a collar and the spring means for each rod comprises a single helical spring surrounding the rod and abutting between the collar and the swash-plate means.

4. A fatigue-testing machine as set forth in claim 2 wherein said means guiding said rods comprises a pair of multi-armed spiders of thin spring material spaced apart along the principal axis, each rod being supported by one arm of each of the two spiders.

5. A fatigue-testing machine as set forth in claim 2 wherein said means guiding said rods comprises a pair of multi-arm spiders of thin spring material spaced apart along the principal axis, each rod being supported by one arm of each of the two spiders, and each rod projects through the swash-plate means and carries a collar beyond the swash-plate means, the spring means comprising a single helical spring surrounding each rod and abutting between the collar and the swash-plate means.

6. A fatigue-testing machine as set forth in claim 1, wherein said swash-plate is universally pivoted to a member guided to move in said main framework in a path along said principal axis, and means for adjusting said member along its path and holding it in adjusted position whereby the point at which said swash-plate is pivoted can be adjusted in relation to the plane of action of the rotating runner and the angle of tilt of said swash-plate thereby be varied.

7. In a fatigue-testing machine as set forth in claim 1, wherein said deflection means is comprised of two rollers spaced apart circumferentially and in contact with the swash-plate means in a common plane.

8. In a fatigue testing machine as set forth in claim 1 wherein said swash plate means includes a swash-plate and an anti-friction bearing having one race secured to said swash-plate, and said means includes driving means connecting said roller with the other race of said bearing, said driving means permitting tilt of said swash-plate in relation to said roller.

9. A fatigue-testing machine as set forth in claim 1 wherein there is provided a stop for each loading head which limits the movement of the load-applying part of the head when the respective specimen breaks or there is no specimen in the head.

10. A fatigue-testing machine as set forth in claim 9 wherein there is provided a counter for each loading head, electrically operated means for actuating each counter in timed relationship with the revolution of said deflection means, and a contact constituting an element of each stop and controlling the corresponding counter whereby said counter is stopped when the corresponding head abuts its stop.

11. A fatigue-testing machine as set forth in claim 9 wherein there is provided a contact closed when movement of the corresponding head is limited by its stop, an electric circuit common to all said contacts, and signal means actuated by said circuit when all the heads abut their stops.

12. A fatigue-testing machine as set forth in claim 9 also comprising a counter for each loading head, electrically operated means for actuating each counter in timed relationship with the revolution of said deflection means, a first contact constituting an element of each stop and controlling the corresponding counter whereby said counter is stopped when the corresponding head abuts its stop, a second contact also closed when the first contact abuts its stop, an electric circuit common to all said second contacts and signal means actuated by said circuit when all the heads abut their stops.

13. A fatigue-testing machine as set forth in claim 1 also comprising dynamic balancing means consisting of an elastic cantilever anchored to the main framework and extending along the principal axis, and a symmetrically arranged mass carried at the free end of the cantilever.

14. A fatigue-testing machine as set forth in claim 13 wherein the cantilever is in part doubled on itself.

15. A fatigue-testing machine comprising a frame, deflection means journalled in said frame to rotate about a vertical principal axis without axial movement, a non-rotating swash-plate universally jointed in said frame at a point on the principal axis so located above said deflection means that said deflection means engages said swash-plate with the swash-plate in a tilted position, a pair of radial armed spiders of thin spring material fixed to said frame symmetrically disposed in relation to and axially spaced along the principal axis located above the swash-plate, a plurality of rods set in a circle around and parallel to the principal axis, each carried by one arm each of said spiders, said rods projecting downwardly through clearing holes in the swash-plate and carrying a collar below the swash-plate, a helical spring surrounding each rod and abutting between the collar and the swash-plate, means at the upper end of each rod for engaging a specimen, and means above the spiders for anchoring specimens, one for each rod, to the frame.

16. A fatigue-testing machine as set forth in claim 15 also comprising a central vertical sleeve secured to said frame co-axial with the principal axis and serving as a central support for said spiders and anchoring means, a stem axially slidable within said sleeve to the lower end of which stem the swash-plate is universally jointed, and means for axially adjusting the position of said stem.

17. A fatigue-testing machine as set forth in claim 15 further comprising an upwardly directed inner elastic cantilever section projecting above said spiders and anchoring means, a downwardly extending hollow outer elastic cantilever firmly secured to the upper end of said inner section and extending over part only of its length, a symmetrically disposed mass secured to the lower end of the outer cantilever section, said cantilever sections and mass constituting dynamic balancing means for the machine at its normal operating speed.

18. A fatigue-testing machine as set forth in claim 15 also comprising a central vertical sleeve secured to said frame coaxial with the principal axis and serving as a support for said spiders and anchoring means, a stem axially-slidable within said sleeve to the lower end of which stem the swash-plate is universally jointed, an inner upwardly-projecting, hollow, elastic cantilever section secured to the upper end of said sleeve, screw means for axially adjusting said stem having an upwardly projecting spindle traversing and extending beyond said inner cantilever section, an outer, hollow, elastic cantilever section secured to the upper end of and projecting downwards outside the inner cantilever section and a symmetrically disposed mass secured to the lower end of said outer cantilever section, said cantilever sections and mass constituting dynamic balancing means for the machine at normal running speed.

19. A fatigue-testing machine as set forth in claim 15 comprising a stop for each arm of the upper spider, each stop being in the form of a contact screw attached to but electrically insulated from the frame and other parts of the machine and located so that the corresponding arm of the spider only contacts it when the corresponding rod is not restrained by a specimen against the action of the corresponding spring, whereby an electrical circuit may be closed between said stop and said spider when a specimen breaks.

References Cited in the file of this patent

UNITED STATES PATENTS

| | | |
|---|---|---|
| 1,595,318 | Shields | Aug. 10, 1926 |
| 2,381,241 | Wilcox | Aug. 7, 1945 |
| 2,595,069 | Fritz | Apr. 29, 1952 |
| 2,612,038 | Pierce | Sept. 30, 1952 |